(12) United States Patent
Goleski et al.

(10) Patent No.: US 8,834,313 B2
(45) Date of Patent: Sep. 16, 2014

(54) MULTIPLE SPEED TRANSMISSION AND METHOD OF OPERATION

(75) Inventors: Gregory Daniel Goleski, Rochester Hills, MI (US); Steven Gerald Thomas, Bloomfield Hills, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/615,858

(22) Filed: Sep. 14, 2012

(65) Prior Publication Data

US 2014/0080657 A1 Mar. 20, 2014

(51) Int. Cl.
*F16H 3/44* (2006.01)

(52) U.S. Cl.
USPC .......................................... 475/292; 475/286

(58) Field of Classification Search
None
See application file for complete search history.

(56) References Cited

U.S. PATENT DOCUMENTS

| | | | |
|---|---|---|---|
| 7,527,576 B2 | 5/2009 | Kamm et al. | |
| 7,597,646 B2 | 10/2009 | Kamm et al. | |
| 7,635,315 B2 | 12/2009 | Kamm et al. | |
| 7,645,207 B2 | 1/2010 | Kamm et al. | |
| 7,682,282 B2 | 3/2010 | Kamm et al. | |
| 7,699,736 B2 | 4/2010 | Diosi et al. | |
| 7,713,161 B2 | 5/2010 | Kamm et al. | |
| 7,789,792 B2 | 9/2010 | Kamm et al. | |
| 7,824,302 B2 | 11/2010 | Diosi et al. | |
| 7,892,137 B2 | 2/2011 | Kamm et al. | |
| 8,113,982 B2 | 2/2012 | Baldwin | |
| 8,133,148 B2 | 3/2012 | Wittkopp et al. | |
| 8,202,191 B2 | 6/2012 | Carey et al. | |
| 8,231,495 B2 | 7/2012 | Gumpoltsberger et al. | |
| 8,303,455 B2 | 11/2012 | Gumpoltsberger et al. | |
| 2008/0248913 A1* | 10/2008 | Kato et al. | 475/276 |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Erin D Bishop
(74) *Attorney, Agent, or Firm* — James Dottavio; Brooks Kushman P.C.

(57) ABSTRACT

A family of transmissions has four planetary gear sets, five controllable clutches and brake, and a passive one way brake. Selective engagement of the brakes and clutches in combinations of three produces eight forward speed ratios and one reverse speed ratio. The passive one way brake is engaged in the first forward speed ratio and overruns in the second through fifth forward speed ratios.

12 Claims, 8 Drawing Sheets

|     | 60 | 62 | 64 | 66 | 68 | 70 | Ratio | Step |
|-----|----|----|----|----|----|----|-------|------|
| Rev |    | X  | X  | X  |    |    | -2.42 | 82%  |
| 1st | X  |    | X  |    | X  |    | 3.93  |      |
| 2nd |    |    | X  | X  | X  |    | 2.32  | 1.69 |
| 3rd |    |    | X  |    | X  | X  | 2.05  | 1.13 |
| 4th |    |    | X  | X  |    | X  | 1.43  | 1.44 |
| 5th |    | X  |    | X  | X  | X  | 1.00  | 1.43 |
| 6th |    | X  |    |    |    | X  | 0.81  | 1.23 |
| 7th |    | X  |    | X  | X  |    | 0.71  | 1.14 |
| 8th |    | X  |    |    | X  |    | 0.56  | 1.27 |

Figure 2

|     | 60 | 62 | 64 | 68 | 70 | 72 | Ratio | Step |
|-----|----|----|----|----|----|----|-------|------|
| Rev | X  | X  | X  |    |    | X  | -2.42 | 82%  |
| 1st |    |    | X  | X  |    |    | 3.93  |      |
| 2nd |    |    | X  | X  | X  | X  | 2.32  | 1.69 |
| 3rd |    |    | X  | X  | X  |    | 2.05  | 1.13 |
| 4th |    |    | X  |    | X  | X  | 1.43  | 1.44 |
| 5th |    |    |    | X  | X  | X  | 1.00  | 1.43 |
| 6th |    | X  |    |    | X  | X  | 0.81  | 1.23 |
| 7th |    | X  |    | X  |    |    | 0.71  | 1.14 |
| 8th |    | X  |    | X  |    | X  | 0.56  | 1.27 |

Figure 4

|     | 60 | 62 | 64 | 68 | 70 | 74 | Ratio | Step |
|-----|----|----|----|----|----|----|-------|------|
| Rev | X  | X  | X  |    |    | X  | -2.42 | 82%  |
| 1st |    |    | X  | X  |    |    | 3.93  |      |
| 2nd |    |    | X  | X  | X  | X  | 2.32  | 1.69 |
| 3rd |    |    | X  | X  | X  |    | 2.05  | 1.13 |
| 4th |    |    | X  |    | X  | X  | 1.43  | 1.44 |
| 5th |    |    |    | X  | X  | X  | 1.00  | 1.43 |
| 6th |    | X  |    |    | X  | X  | 0.81  | 1.23 |
| 7th |    | X  |    | X  |    |    | 0.71  | 1.14 |
| 8th |    | X  |    | X  |    | X  | 0.56  | 1.27 |

Figure 6

MULTIPLE SPEED TRANSMISSION AND METHOD OF OPERATION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements may be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake. A group of elements are coupled if they are fixedly coupled or selectively coupled.

The speed ratio of a shiftable gearing arrangement may be changed by altering which clutches are engaged. An upshift occurs when the speed ratio is decreased and a downshift occurs when the speed ratio is increased. During a shift, a controller typically manipulates the torque capacity of at least one controllable clutch. When the state of more than one controllable clutch must change during a shift event, the relative torque capacity of these clutches must be carefully synchronized to avoid torque disturbances that annoy vehicle occupants. Vehicle occupants are most likely to be annoyed by torque disturbances associated with shifts between high speed ratios because the torque disturbances are multiplied by the gearing. The challenge of coordinating the clutch torque capacities during a shift is avoided if either the on-coming or off-going clutch is a passive device.

SUMMARY OF THE DISCLOSURE

A family of transmissions is disclosed. Each transmission includes an input shaft, an output shaft, a number of rotating elements, and gearing arrangements and clutches that impose specified fixed and selectable speed relationships. Additionally, a method of operating a transmission of the disclosed family is described.

In one embodiment, a transmission includes at least first, second, third, fourth, and fifth elements in addition to the input shaft and output shaft. A first gearing arrangement fixedly constrains the relative speeds of the input shaft, first element, second element, and third element. The first gearing arrangement may be, for example, two simple planetary gear sets with the two sun gears fixedly coupled and forming the third element, the first carrier fixedly coupled to the input shaft, the first ring gear and second carrier fixedly coupled and forming the second element, and the second ring gear forming the first element. A second gearing arrangement fixedly constrains the relative speeds of the second, fourth, and fifth elements. The second gearing arrangement may be, for example, a simple planetary gear set having a sun gear as the second element, a planet carrier as the fourth element, and a ring gear as the fifth element. Alternatively, the second gearing arrangement may be, as another example, a double pinion planetary gear set having a sun gear as the second element, a planet carrier as the fifth element, and a ring gear as the fourth element. A third gearing arrangement selectively constrains the relative speeds of output shaft, third element, and fourth element. The third gearing arrangement may be, for example, a simple planetary gear set having a sun gear fixedly coupled to the third element, a planet carrier selectively coupled to the fourth element by a clutch, and a ring gear fixedly coupled to the output shaft. Alternatively, the third gearing arrangement may be, as another example, a simple planetary gear set having a sun gear fixedly coupled to the third element, a planet carrier fixedly coupled to the fourth element, and a ring gear selectively coupled to the output shaft by a clutch. Alternatively, the third gearing arrangement may be, as yet another example, a simple planetary gear set having a sun gear selectively coupled to the third element by a clutch, a planet carrier fixedly coupled to the fourth element, and a ring gear fixedly coupled to the output shaft. Clutches and brakes may selectively hold the fifth element against rotation, selectively hold the first element against rotation, selectively operatively couple the fourth element to the output shaft, and selectively couple the third element to the fifth element.

In another embodiment, a transmission includes at least second, third, fourth, and fifth elements in addition to the input shaft and output shaft. A first gearing arrangement selectively constrains the relative speeds of the second and third elements. The first gearing arrangement may be, for example, a simple planetary gear set having a sun gear as the third element, a planet carrier as the second element, and a ring gear selectively held against rotation by a brake. A second gearing arrangement fixedly constrains the relative speeds of the input shaft, the second element, and the third element. The second gearing arrangement may be, for example, a simple planetary gear set having a sun gear as the third element, a planet carrier fixedly couple to the input shaft, and a ring gear as the second element. A third gearing arrangement fixedly constrains the relative speeds of the second, fourth, and fifth elements. A fourth gearing arrangement selectively constrains the relative speeds of output shaft, third element, and fourth element. Clutches and brakes may selectively hold the fifth element against rotation, selectively operatively couple the fourth element to the output shaft, and selectively couple the third element to the fifth element.

In another embodiment, a transmission includes five controllable clutches, a passive clutch, and gearing configured to establish eight forward speed ratios and one reverse speed ratio between the input shaft and the output shaft. The passive clutch is engaged in the first forward speed ratio and overruns in the second forward speed ratio. A first forward ratio is established by engaging the first and second controllable clutch while the third, fourth, and fifth controllable clutches remain disengaged. An upshift to a second ratio is accomplished by engaging the third clutch while the first and second clutches remain engaged and the fourth and fifth clutches remain disengaged. Additional upshifts to third through eighth forward ratios are accomplished by engaging one of the five controllable clutches and disengaging another of the five controllable clutches. A reverse ratio is established by engaging the first, third, and fourth controllable clutches while the second and fifth controllable clutches remain disengaged.

BRIEF DESCRIPTION OF THE DRAWINGS

FIG. 2 is a clutch application chart for the first and fourth transmission gearing arrangements;

FIG. 4 is a clutch application chart for the second transmission gearing arrangement;

FIG. 6 is a clutch application chart for the third transmission gearing arrangement;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
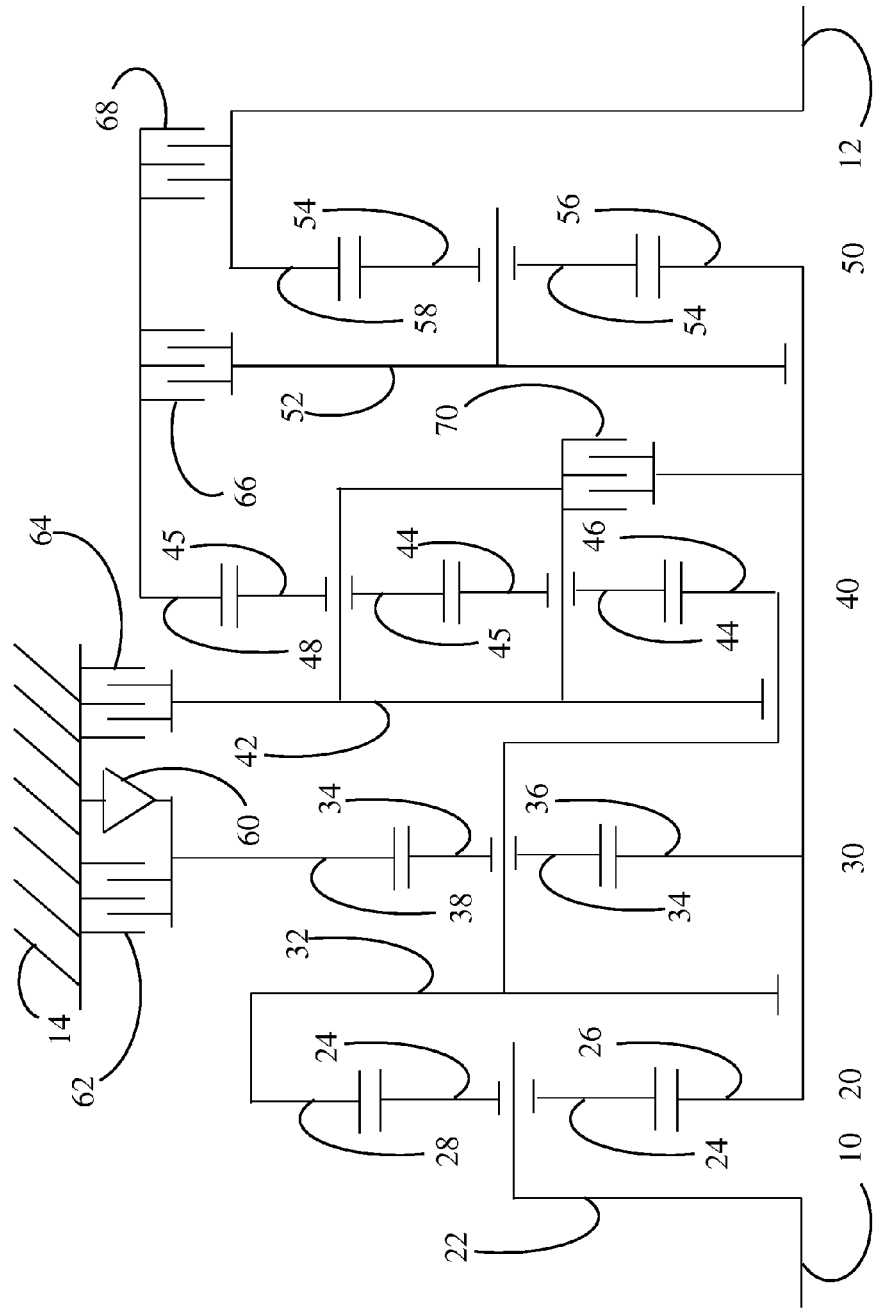
FIG. 1 is a schematic diagram of a first transmission gearing arrangement.

An example transmission is schematically illustrated in FIG. 1. The transmission utilizes four planetary gear sets 20, 30, 40, and 50. Gear sets 20, 30, and 50 are simple planetary gear sets. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes the fixed speed relationship that the speed of the carrier is between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear.

Gear set 40 is a double pinion planetary gear set, which is another type of fixed gearing arrangement. A planet carrier 42 rotates about a central axis and supports an inner set of planet gears 44 and an outer set of planet gears 45. External gear teeth on each of the inner planet gears 44 mesh with external gear teeth on a sun gear 46 and with internal gear teeth on one of the outer planet gears 45. External gear teeth on each of the outer planet gears 45 mesh with internal gear teeth on a ring gear 48. The sun gear and ring gear are supported to rotate about the same axis as the carrier. A double pinion planetary gear set imposes the fixed speed relationship that the speed of the ring gear is between the speed of the sun gear and the speed of the carrier. (This relationship is defined to include the condition in which all three rotate at the same speed.) More specifically, the speed of the ring gear is a weighted average of the speed of the sun gear and the speed of the carrier with weighting factors determined by the number of teeth on each gear. Similar speed relationships are imposed by other known types of fixed gearing arrangements.

A suggested ratio of gear teeth for each planetary gear set in FIG. 1 is listed in Table 1.

TABLE 1

| | |
|---|---|
| Ring 28/Sun 26 | 2.73 |
| Ring 38/Sun 36 | 1.50 |
| Ring 48/Sun 46 | 2.80 |
| Ring 58/Sun 56 | 2.29 |

Input shaft 10 is fixedly coupled to carrier 22. Output shaft 12 is fixedly coupled to ring gear 58. Sun gear 26, sun gear 36, and sun gear 56 are fixedly coupled to one another. Ring gear 28, carrier 32, and sun gear 46 are fixedly coupled to one another. Ring gear 38 is selectively held against rotation by controllable brake 62 and passively held against rotation in one direction by one way brake 60. Carrier 42 is selectively coupled to sun gear 26, sun gear 36, and sun gear 56 by clutch 70 and selectively held against rotation by brake 64. Ring gear 48 is selectively coupled to carrier 52 by clutch 66 and selectively coupled to ring gear 58 and output shaft 12 by clutch 68.

As shown in FIG. 2, engaging the clutches and brakes in combinations of three establishes eight forward speed ratios and one reverse speed ratio between input shaft 10 and output shaft 12. An X indicates that the clutch is engaged to establish the speed ratio. When the gear sets of FIG. 1 have tooth numbers as indicated in Table 1, the speed ratios have the values indicated in FIG. 2. The highest forward speed ratio, which can be used to accelerate from rest, is established by engaging controllable brake 64 and controllable clutch 68.

One way brake 60 engages passively to transmit power in the positive direction. To upshift into the second highest speed ratio, clutch 66 is engaged. As the torque capacity of clutch 66 increases, the torque carried by one way brake 60 decreases. When the torque capacity of one way brake 60 reaches zero, it overruns. An overrunning condition for a passive clutch is characterized by relative speed between the corresponding elements. For one way brake 60, the corresponding elements are the transmission case 14 and ring gear 38. The remaining shifts are accomplished by the coordinated engagement of a controllable clutch or brake and release of a different clutch or brake as indicated in FIG. 2.

Figure 3:
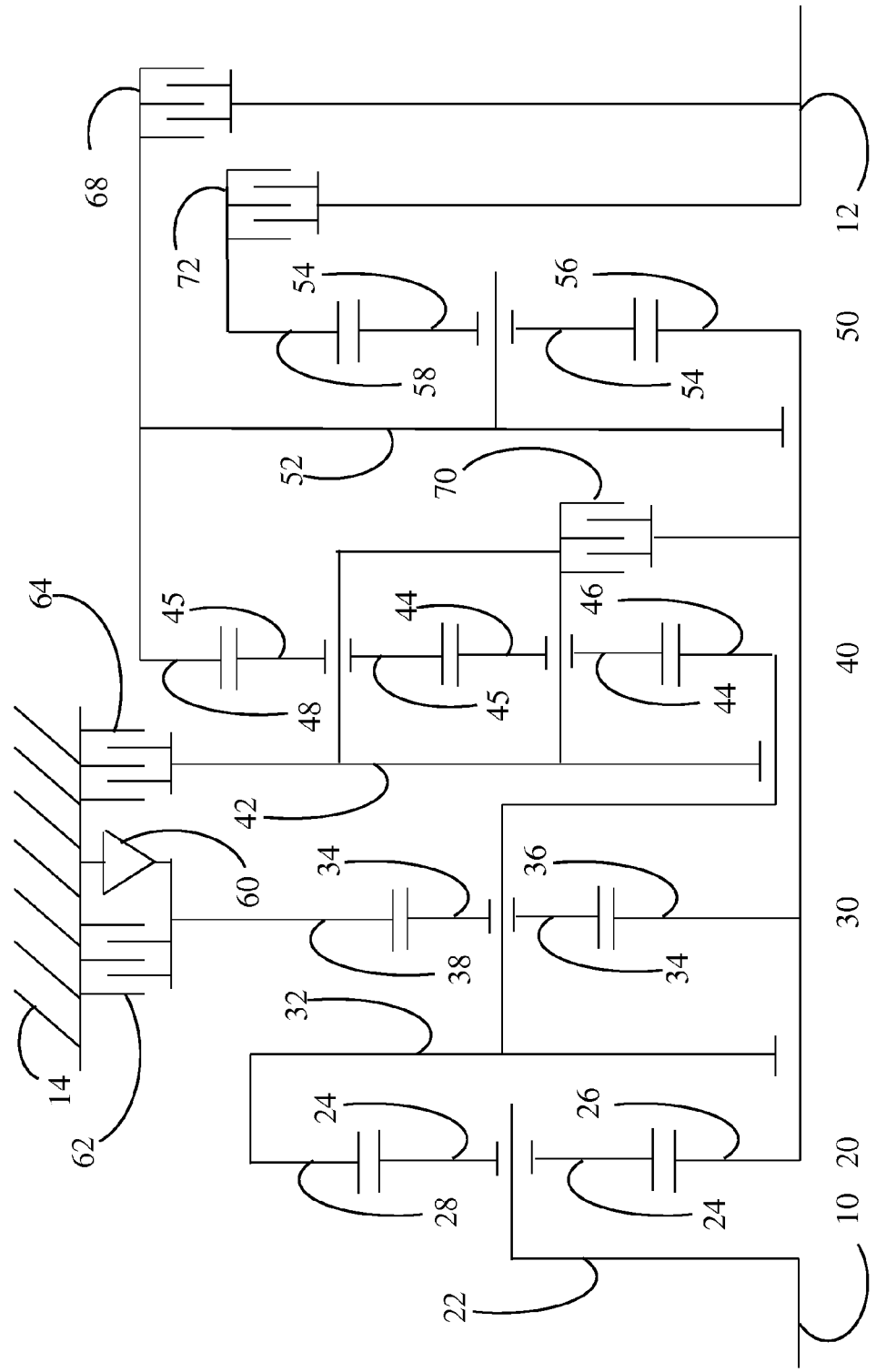
FIG. 3 is a schematic diagram of a second transmission gearing arrangement.

Another example transmission is illustrated in FIG. 3. The transmission utilizes three simple planetary gear sets 20, 30, and 50 and one double pinion planetary gear set 40. A suggested ratio of gear teeth for each planetary gear set is listed in Table 1 above. Input shaft 10 is fixedly coupled to carrier 22. Sun gear 26, sun gear 36, and sun gear 56 are fixedly coupled to one another. Ring gear 28, carrier 32, and sun gear 46 are fixedly coupled to one another. Ring gear 48 is fixedly coupled to carrier 52. Ring gear 38 is selectively held against rotation by controllable brake 62 and passively held against rotation in one direction by one way brake 60. Carrier 42 is selectively coupled to sun gear 26, sun gear 36, and sun gear 56 by clutch 70 and selectively held against rotation by brake 64. Output shaft 12 is selectively coupled to ring gear 58 by clutch 72 and selectively coupled to ring gear 48 and carrier 52 by clutch 68. As shown in FIG. 4, engaging the clutches and brakes in combinations of three establishes eight forward speed ratios and one reverse speed ratio between input shaft 10 and output shaft 12.

Figure 5:
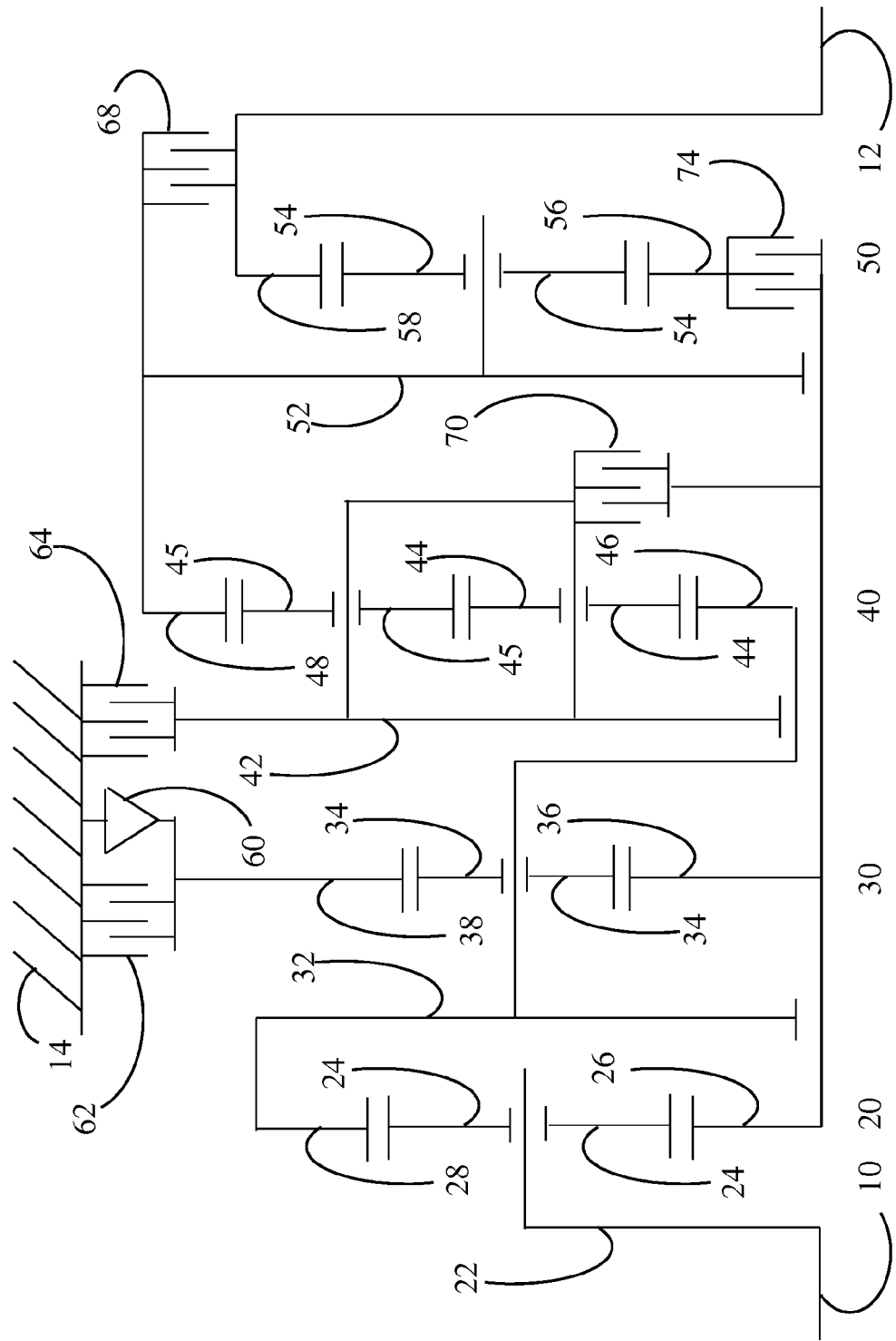
FIG. 5 is a schematic diagram of a third transmission gearing arrangement.

A third example transmission is illustrated in FIG. 5. The transmission utilizes three simple planetary gear sets 20, 30, and 50 and one double pinion planetary gear set 40. A suggested ratio of gear teeth for each planetary gear set is listed in Table 1 above. Input shaft 10 is fixedly coupled to carrier 22. Output shaft 12 is fixedly coupled to ring gear 58. Sun gear 26 is fixedly coupled to sun gear 36. Ring gear 28, carrier 32, and sun gear 46 are fixedly coupled to one another. Ring gear 48 is fixedly coupled to carrier 52. Ring gear 38 is selectively held against rotation by controllable brake 62 and passively held against rotation in one direction by one way brake 60. Carrier 42 is selectively held against rotation by brake 64. Sun gear 26 and sun gear 36 are selectively coupled to carrier 42 by clutch 70 and selectively coupled to sun gear 56 by clutch 74. Output shaft 12 and ring gear 58 are selectively coupled to ring gear 48 and carrier 52 by clutch 68. Note that engaging clutch 68 forces gear set 50 to rotate as a unit. Clutch 68 could alternatively accomplish this function by selectively coupling any two of the elements of gear set 50. As shown in FIG. 6, engaging the clutches and brakes in combinations of three establishes eight forward speed ratios and one reverse speed ratio between input shaft 10 and output shaft 12.

Figure 7:
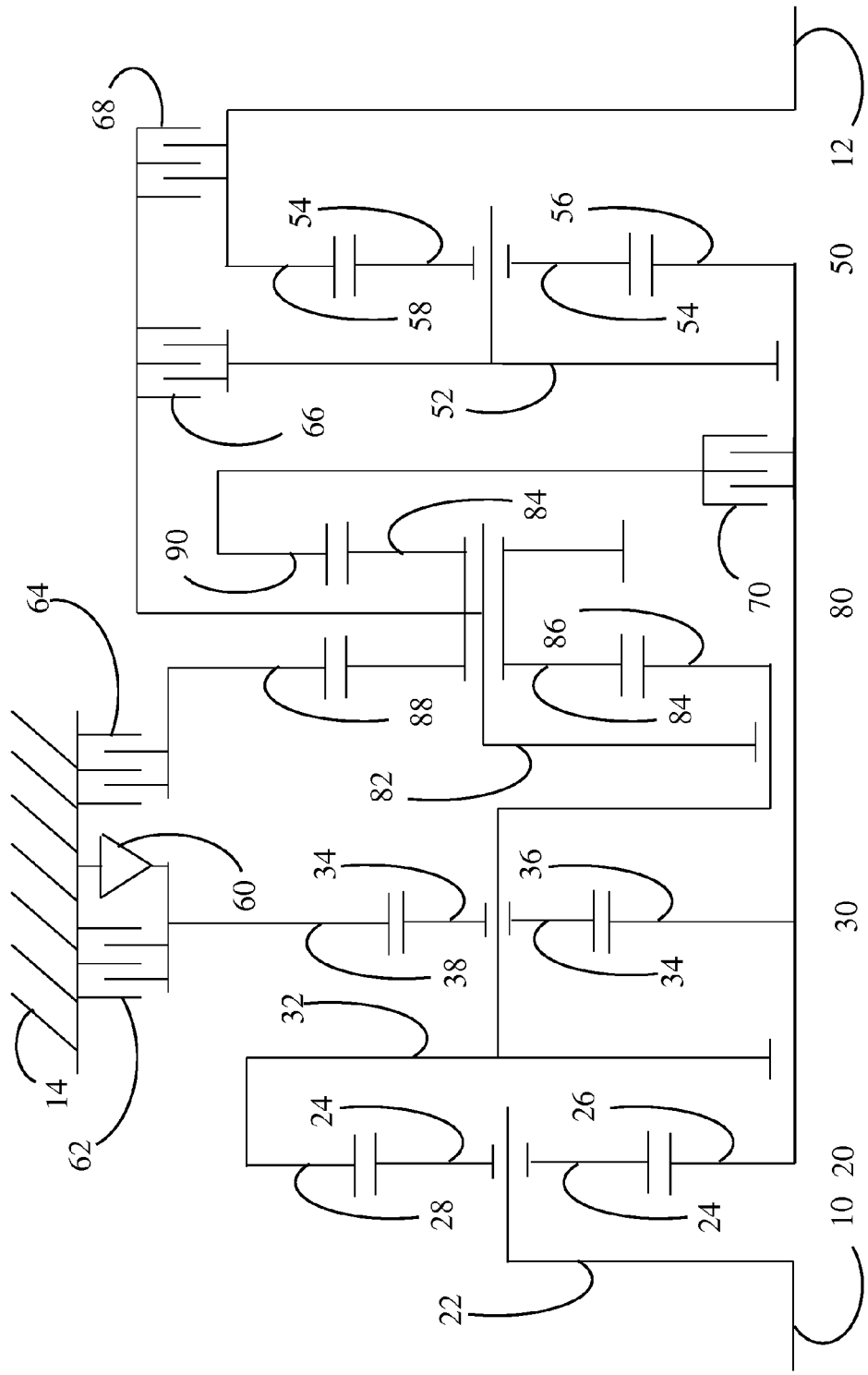
FIG. 7 is a schematic diagram of a fourth transmission gearing arrangement.

A fourth example transmission is illustrated in FIG. 7. The transmission utilizes four simple planetary gear sets 20, 30, 80, and 50. The planet gears 84 of gear set 80 are wide enough to mesh with two ring gears 88 and 90. Although ring gear 88 and ring gear 90 are not directly connected, they are forced to rotate at the same speed by the interaction with planet gear 84. The carrier 82 of gear set 80 extends outwardly between ring gears 88 and 90 in the circumferential space between the planet gears 84. A suggested ratio of gear teeth for each planetary gear set is listed in Table 2.

TABLE 2

| | |
|---|---|
| Ring 28/Sun 26 | 2.73 |
| Ring 38/Sun 36 | 1.50 |
| Ring 48/Sun 46 | 1.80 |
| Ring 58/Sun 56 | 2.29 |

Input shaft 10 is fixedly coupled to carrier 22. Output shaft 12 is fixedly coupled to ring gear 58. Sun gear 26, sun gear 36, and sun gear 56 are fixedly coupled to one another. Ring gear 28, carrier 32, and sun gear 86 are fixedly coupled to one another. Ring gear 38 is selectively held against rotation by controllable brake 62 and passively held against rotation in one direction by one way brake 60. Ring gear 90 is selectively coupled to sun gear 26, sun gear 36, and sun gear 56 by clutch 70. Ring gear 88 is selectively held against rotation by brake 64. Carrier 82 is selectively coupled to carrier 52 by clutch 66 and selectively coupled to ring gear 58 and output shaft 12 by clutch 68. As shown in FIG. 2, engaging the clutches and brakes in combinations of three establishes eight forward speed ratios and one reverse speed ratio between input shaft 10 and output shaft 12.

Figure 8:
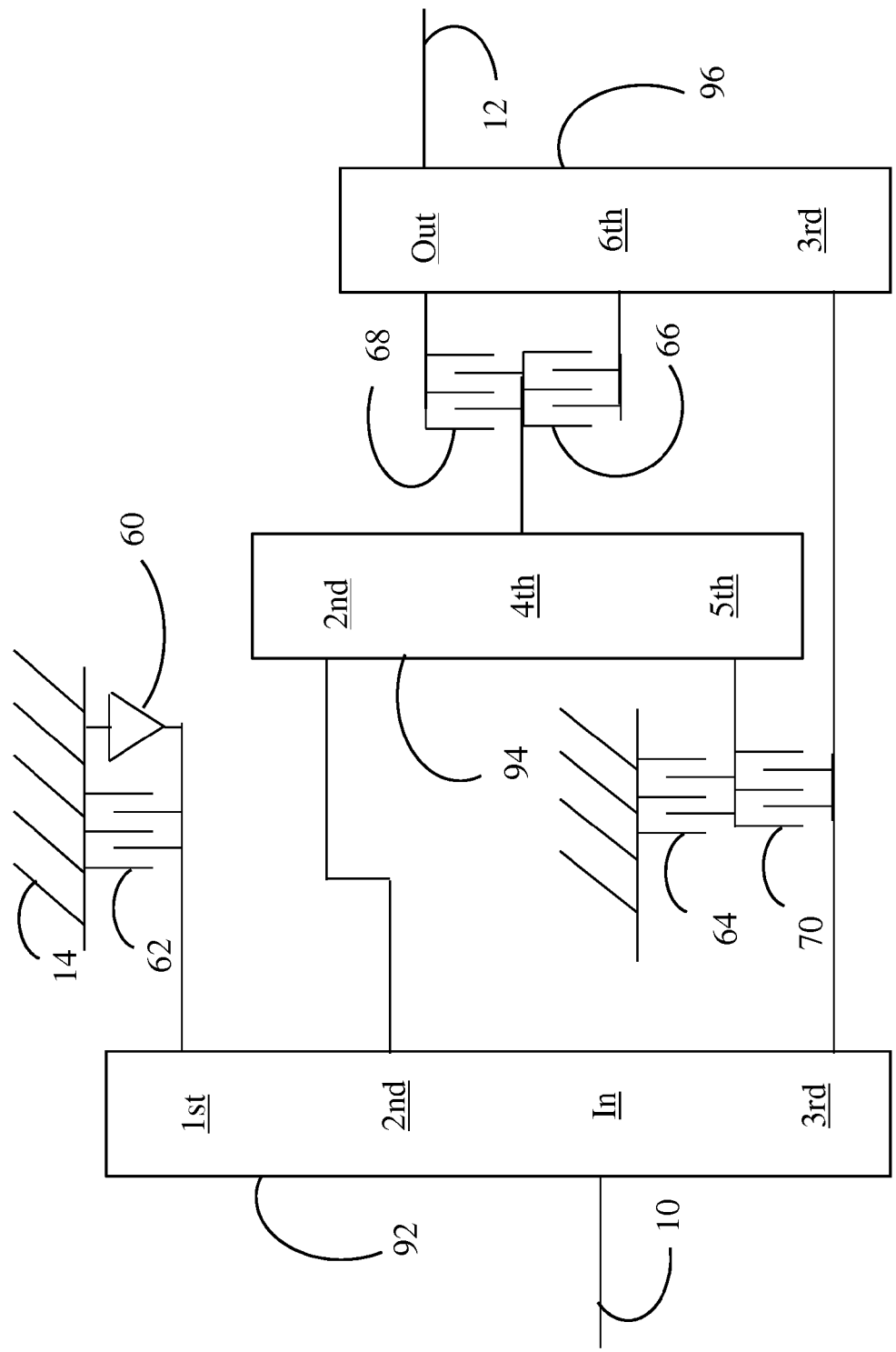
FIG. 8 is a lever diagram corresponding to the first and fourth transmission gearing arrangements.

FIG. 8 describes the transmissions of FIGS. 1 and 7 in the form of a lever diagram. Gear elements which rotate about a common axis and have speeds with a fixed linear relationship are shown along a lever according to their relative speeds. The two elements that have the most extreme speeds are shown at the endpoints of the lever. The remaining elements are shown at intermediate points according to the weighting factors. Four node lever 92 corresponds to gear sets 20 and 30 with ring gear 38 as the 1st element, ring gear 28 and carrier 32 as the 2nd element, and sun gears 26 and 36 as the 3rd element. The 1st and 3rd elements will have the most extreme speeds among the four elements in all operating conditions. The input and 2nd element will have intermediate speeds with the speed of the 2nd element closer to that of the 1st element and the speed of the input closer to that of the 3rd element. Many known fixed gearing arrangements impose the speed relationship represented by a four node lever. Specifically, any two simple or double pinion planetary gear sets with two fixed connections can be represented by a four node lever. Also, the speed relationship may be implemented by arrangements with shared planet gears or stepped planet gears. Gear sets 20 and 30 may be replaced with another fixed gearing arrangement that imposes the same speed relationships without impacting the operation or resulting speed ratios. Some of these gearing arrangements will be preferable to others in terms of packaging, efficiency, and planet gear speeds. Similarly, lever 94 corresponds to either gear set 40 of FIG. 1 or gear set 80 of FIG. 7. In FIG. 1, sun gear 46 is the 2nd element, ring gear 48 is the 4th element, and carrier 42 is the 5th element. In FIG. 7, sun gear 86 is the 2nd element, carrier 82 is the 4th element, and ring gears 88 and 90 are the 5th element. Finally, lever 96 corresponds to gear set 50, with the 3rd element corresponding to sun gear 56, the 6th element corresponding to carrier 52.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input shaft;
   an output shaft;
   a gearing arrangement having no more than five controllable clutches configured to transmit power from the input shaft to the output shaft at eight forward speed ratios and a reverse speed ratio by selective engagement of the controllable clutches; and
   a passive clutch configured to engage in a highest of the forward speed ratios and to overrun in a second highest of the forward speed ratios.

2. The transmission of claim 1 wherein the controllable clutches and the passive clutch are configured to establish the speed ratios when engaged in combinations of three.

3. The transmission of claim 1 wherein the gearing arrangement comprises a gear element and the passive clutch is a one way brake configured to prevent the gear element from rotation in a reverse direction while permitting rotation in a forward direction.

4. The transmission of claim 3 wherein a first controllable clutch of the five controllable clutches is configured to selectively hold the gear element against rotation in the forward direction.

5. The transmission of claim 1 wherein the gearing arrangement comprises:
   first, second, third, fourth, fifth, and sixth rotating elements;
   a first gearing arrangement configured to fixedly constrain the second element to rotate at a speed between speeds of the first element and the third element and to fixedly constrain the input shaft to rotate at a speed between speeds of the second element and the third element;
   a second gearing arrangement configured to fixedly constrain the fourth element to rotate at a speed between speeds of the second element and the fifth element; and
   a third gearing arrangement configured to fixedly constrain the sixth element to rotate at a speed between speeds of the third element and the output shaft.

6. The transmission of claim 5 wherein the five controllable clutches comprise:
   a first brake configured to selectively hold the fifth element against rotation;
   a second brake configured to selectively hold the first element against rotation;
   a first clutch configured to selectively operatively couple the fourth element to the output shaft;
   a second clutch configured to selectively couple the third element to the fifth element; and
   a third clutch configured to selectively couple the fourth element to the sixth element.

7. The transmission of claim 5 wherein the first gearing arrangement comprises:
   a first simple planetary gear set having a first sun gear as the third element, a first planet carrier fixedly coupled to the input shaft, a first ring gear as the second element, and a first plurality of planet gears supported for rotation relative to the first planet carrier and in continuous meshing engagement with both the first sun gear and the first ring gear; and
   a second simple planetary gear set having a second sun gear fixedly coupled to the first sun gear, a second planet carrier fixedly coupled to the first ring gear, a second ring gear as the first element, and a second plurality of planet gears supported for rotation relative to the second planet carrier and in continuous meshing engagement with both the second sun gear and the second ring gear.

8. The transmission of claim 5 wherein the third gearing arrangement comprises a third simple planetary gear set having a third sun gear fixedly coupled to the third element, a third planet carrier as the sixth element, a third ring gear fixedly coupled to the output shaft, and a third plurality of planet gears supported for rotation relative to the third planet carrier and in continuous meshing engagement with both the third sun gear and the third ring gear.

9. The transmission of claim 5 wherein the second gearing arrangement comprises a double pinion planetary gear set having a fourth sun gear fixedly coupled to the second element, a fourth planet carrier as the fifth element, a fourth ring gear as the fourth element, a plurality of inner planet gears supported for rotation relative to the fourth planet carrier and in continuous meshing engagement with the fourth sun gear, and a plurality of outer planet gears supported for rotation relative to the fourth planet carrier, each outer planet gear in continuous meshing engagement with one of the inner planet gears and the fourth ring gear.

10. The transmission of claim 1 wherein the gearing arrangement comprises:
    second, third, fourth, and fifth rotating elements;
    a first gearing arrangement configured to selectively constrain the second element to rotate at a speed between zero and a speed of the third element;
    a second gearing arrangement configured to fixedly constrain the input shaft to rotate at a speed between speeds of the second element and the third element;
    a third gearing arrangement configured to fixedly constrain the fourth element to rotate at a speed between speeds of the second element and the fifth element;
    a fourth gearing arrangement configured to selectively constrain the fourth element to rotate at a speed between speeds of the third element and the output shaft;
    and wherein the five controllable clutches comprise a first brake configured to selectively hold the fifth element against rotation;
    a first clutch configured to selectively operatively couple the fourth element to the output shaft; and
    a second clutch configured to selectively couple the third element to the fifth element.

11. The transmission of claim 10 wherein the first gearing arrangement comprises:
    a simple planetary gear set having a sun gear as the third element, a planet carrier as the second element, a ring gear, and a plurality of planet gears supported for rotation relative to the planet carrier and in continuous meshing engagement with both the sun gear and the ring gear; and
    and wherein the five controllable clutches further comprise a second brake configured to selectively hold the ring gear against rotation.

12. The transmission of claim 10 wherein the fourth gearing arrangement comprises:

a simple planetary gear set having a sun gear fixedly coupled to the third element, a planet carrier, a ring gear fixedly coupled to the output shaft, and a plurality of planet gears supported for rotation relative to the planet carrier and in continuous meshing engagement with both the sun gear and the ring gear; and and wherein the five controllable clutches further comprise a third clutch configured to selectively couple the planet carrier to the fourth element.

\* \* \* \* \*